(12) United States Patent
Yang et al.

(10) Patent No.: US 8,587,172 B2
(45) Date of Patent: Nov. 19, 2013

(54) SENSOR FASTENING METHOD AND SENSOR FASTENING FRAME FOR USE THEREWITH

(75) Inventors: Shih-Jen Yang, Taipei (TW); Hung-Sen Tu, Taipei (TW); I-Hsing Chen, Taipei (TW); Chen-Chia Yang, Taipei (TW); Chung-En Chen, Hualien (TW)

(73) Assignee: System General Corporation, Taipei (TW)

( * ) Notice: Subject to any disclaimer, the term of this patent is extended or adjusted under 35 U.S.C. 154(b) by 160 days.

(21) Appl. No.: 12/358,520

(22) Filed: Jan. 23, 2009

(65) Prior Publication Data

US 2009/0309441 A1   Dec. 17, 2009

(30) Foreign Application Priority Data

Jun. 11, 2008   (TW) .................................. 97121654

(51) Int. Cl.
*H02K 11/00* (2006.01)

(52) U.S. Cl.
USPC .......................................... 310/91; 310/68 B

(58) Field of Classification Search
USPC .................... 310/68 B, 68 R, 254.1, 260, 273
See application file for complete search history.

(56) References Cited

U.S. PATENT DOCUMENTS

| | | | | |
|---|---|---|---|---|
| 4,005,347 A | * | 1/1977 | Erdman | 318/400.4 |
| 4,217,508 A | * | 8/1980 | Uzuka | 310/46 |
| 4,540,906 A | * | 9/1985 | Blom | 310/67 R |
| 6,020,660 A | * | 2/2000 | Wright | 310/68 R |
| 6,025,665 A | * | 2/2000 | Poag et al. | 310/89 |
| 6,153,957 A | * | 11/2000 | Takano | 310/71 |
| 6,806,666 B2 | * | 10/2004 | Kim et al. | 318/362 |
| 6,819,022 B2 | * | 11/2004 | Yamamoto et al. | 310/156.05 |
| 2006/0001392 A1 | * | 1/2006 | Ajima et al. | 318/432 |
| 2006/0238059 A1 | * | 10/2006 | Komatsu | 310/162 |

FOREIGN PATENT DOCUMENTS

WO    WO 2008027535 A2 *  3/2008    ............... H02K 3/52

* cited by examiner

*Primary Examiner* — Burton Mullins
*Assistant Examiner* — Eric Johnson
(74) *Attorney, Agent, or Firm* — Pearne & Gordon LLP

(57) ABSTRACT

A sensor fastening method and a sensor fastening frame for use therewith are provided. The sensor fastening frame is coupled to a motor stator of a brushless motor having distributed coils and extends over the distributed coils to allow the sensor fastening frame to rotate about the axle of a motor rotor, without interference with the distributed coils. At least a sensor is fastened in position to the sensor fastening frame proximate to one end of the axle of the motor stator for positioning the sensor to detect magnetic field variations of the motor rotor.

10 Claims, 5 Drawing Sheets

SENSOR FASTENING METHOD AND SENSOR FASTENING FRAME FOR USE THEREWITH

BACKGROUND OF THE INVENTION

1. Field of the Invention

The present invention relates to the field of motor control, and more particularly, to a method of fastening in position a sensor to a motor stator of a distributed-wound brushless DC motor and a sensor fastening frame.

2. Description of Related Art

Motors have developed from the earliest DC and AC motors to modern brushless DC motors (BLDC). A general DC motor with carbon brushes uses the brushes to transmit DC power to the commutator. The commutator then guides the current to the coils on the rotor to generate electromagnetic force, which produces attractive and repulsive effects with the stator on the permanent magnet thereby inducing rotation. Change of the direction of the electromagnetic force relies on the change of carbon brushes in contact during the rotation of the commutator (the commutator being installed on the rotor and rotating with the rotor). Different carbon brushes have different polarities, allowing change in the current direction. Many disadvantages result from the use of carbon brushes utilized this way such as friction causing unnecessary mechanical energy loss due to contact with commutator. The materials in contact increase the overall resistance, which in turn decreases power transmission. Also, current alternates on the contact surfaces, thereby generating sparks which lead to electronic interference. Furthermore, cleaning and replacement of carbon brushes are labor intensive and costly.

As for the principles of an AC motor, alternating current is responsible for alternating the polarities to introduce alternating current into an outside stationary stator having coils to produce a rotating magnetic field. Such a magnetic field then generates rotations of the permanent magnet on the inside rotor. An AC motor completely overcomes the drawbacks caused by contact between carbon brushes and the commutator in a DC motor and is currently the most widely used electric motor with high output efficiency. However, it is difficult to control the speed of an AC motor. Speed changes depend on control of the alternating current frequency, while voltage changes only result in torque changes. Also, AC motors aren't directly applicable in applications needing direct current such as IT products and electric cars.

Brushless DC motors inherit the advantages of the above two types of motors. The brushless design eliminates trouble caused by frictions due to contact and the use of direct current allows easier control. The principles and structure of a brushless DC motor are very similar to the aforementioned AC motor. Basically, an rotor is made up of a permanent magnet. As long as the magnetism remains unchanged, the stator is then identical to that of the DC motor. Magnetic force is generated via coils.

FIGS. 1 and 2 are diagrams illustrating the operating principles of a simple brushless DC motor. As shown in FIG. 1, an rotor 10 is made of a permanent magnet presenting different polarities at each end. A stator 11 and a stator 12 are general electromagnetic coils, which in turn generate magnetic force via current flow. The labels N and S on the drawings represent the north and south poles of the magnetic field, respectively. The motor of FIG. 1 is in its initial state. Current is introduced from the top of the stator 11 and the stator 12. Arrows on the coils refer to the directions of current flow, wherein the generated magnetic fields mutually attract the poles of the rotor magnet having opposite polarities, thereby causing both ends of the rotor 10 to move closer to the stators 11, 12, thus effecting clockwise rotation.

As shown in FIG. 2, the rotor 10 rotates from the position shown in FIG. 1 to the position where it center is aligned with the center points of the stators 11, 12, whereupon the direction of current is then reversed to input current from the bottom. The magnetic field direction of the electromagnets consequently reverses, repulsively pushing the two ends of the rotor 10 away from the stators 11, 12, as shown in FIG. 2, continuing rotation of the rotor 10 in a clockwise direction. This method of using alternating current input directions to change the direction of the magnetic fields continues until smooth rotor 10 rotation is achieved. In practice, an actual motor has a more complex design and more stators are installed to increase its performance.

In order to generate an appropriate direction of the magnetic field in accordance with the rotor 10 position, a Hall sensor is utilized to ascertain the rotor 10 position. A Hall sensor is a sensing component that detects the direction of the magnetic field. Its working principle is well known and will not be elaborated on. The structure and method are only discussed in terms of Hall sensor installation.

FIG. 3 illustrates a structure of a stator of a conventional brushless DC motor. The stator adopts the method of concentrated coils, whereby wires 20 are wound on individual fixed cores at preset positions of the stator 21. The coils formed by winding the wires 20 on each individual fixed core do not overlap, so called concentrated coils. Insulating frames 22 protruding above and below the wires are installed on the inner and outer rings of the stator 21, and may be used to support and/or attach Hall sensors as explained subsequently. As shown in FIG. 4, the stator 21 and a Hall sensor PCB 24 are installed in the conventional brushless DC motor in accordance with the following sequence: the stator 21 with insulating frames 22 is first put into a casing 25; BLDC rotors 23 are subsequently inserted; and finally the Hall sensor PCB 24 is installed on the top end of the insulating frames 22.

However, such a Hall sensor board is only appropriate for new molded stator structures because modern brushless DC motors are still in the early development stage and there are only a few standardized components on the market. Using concentrated coils to manufacture a brushless DC motor has the advantages of a lower overall thickness and a simplified magnetic field control, but efficiently manufacturing motors does not just involve the motor design but also the manufacturing techniques. In order to manufacture high-speed motors, companies have to invest a significant amount of capital in developing machines and molds. Also, in order to achieve an effective production scale to lower the cost, companies are reluctant to change the existing standard production flow.

Hence, based on the similarities of the structures of brushless DC motors and AC motors, a technique of installing AC motor stators in brushless DC motors has developed, called distributed-wound brushless DC motors. As shown in FIG. 5, a conventional AC motor stator is illustrated. The coil winding method adopted is the distributed coil winding method. Wires 40 overlap one another on a stator 42 (only partial wires are shown for clarity), which is a totally different technique compared to the previous technique of using concentrated coils. The advantages of distributed coils are well known and will not be elaborated.

However, the most difficult part in the application of the motor stator 42 to the brushless DC motor is that the protruding height 41 of the distributed coils obstructs the installation of Hall sensors, and the motor stator 42 also lacks the corresponding structure for installing Hall sensors.

In summary, in view of the drawbacks of the conventional techniques and practical manufacturing limitations, it is a critical challenge for designers of motors to develop a structure and a method for fastening Hall sensors to the traditional AC motor stator structure without changing the existing motor manufacturing machines and established standard procedures, thereby allowing low-cost, reliable traditional AC motor stators to serve as components of brushless DC motors.

SUMMARY OF THE INVENTION

In view of the above disadvantages of the conventional technique, it is a primary objective of the present invention to provide a sensor fastening method for fastening in position a sensor to a motor stator of a distributed-wound brushless DC motor, and a sensor fastening frame applicable to the method, thereby allowing a motor stator of a traditional distributed-wound brushless AC motor to be used as the motor stator of the distributed-wound brushless DC motor.

It is another objective of the present invention to provide a cost-effective sensor fastening method and a sensor fastening frame applicable to the method.

In order to achieve the aforementioned and other objectives, the present invention provides a sensor fastening frame for fastening in position a sensor to a motor stator of a distributed-wound brushless DC motor with the motor stator having a first coupling portion, wherein the sensor fastening frame comprises: a frame body; a second coupling portion provided to the frame body and extending toward a first direction; and a fastening part attached onto the frame body for securely fastening the sensor and extending toward a second direction.

With regard to the aforementioned sensor fastening frame, a side of the frame body proximate to the second coupling portion forms an arc, and the curvature of the arc as well as the center-of-curvature are the same as the periphery of the motor stator. The frame body is formed with an adjustment slot, and the second coupling portion is formed with a sliding rail for being engaged with the adjustment slot via at least an adjustable screw, so as to secure the second coupling portion to the frame body. The curvatures of the sliding rail as well as the center-of-curvature are the same as the periphery of the motor stator. The first direction is orthogonal to the second direction.

As for the aforementioned fastening frame, the second coupling portion is located away from the frame body and forms a carrier board, and the curvature of the periphery of the carrier board as well as the center-of-curvature are the same as the periphery of the motor stator. Also, the second coupling portion is in the form of a protruding pin capable of being inserted into the first coupling portion functioning as a guiding slot. The first coupling portion functioning as a guiding slot and the second coupling portion has a cross section, such as circle, triangle, square, or oval.

In a sensor fastening frame of an embodiment, the sensor is fastened to the fastening part by a means of fastening, such as screws, glue, rivets, welding, and hooks. The aforementioned frame body, the second coupling portion, and the fastening part are either plastic or non-magnetic metal. The non-magnetic metal is made up of a material selected from the group consisting of aluminum, copper, zinc, tantalum, and stainless steel. The aforementioned sensor, such as a Hall sensor, serves to detect magnetic field variations.

The present invention further provides a sensor fastening method for suspending sensors by fastening sensors to a first coupling portion of the motor stator of a distributed-coil brushless DC motor, thereby suspending the sensors for detecting magnetic field variations of the motor rotor of a distributed-wound brushless DC motor. This sensor fastening method comprises: providing a sensor fastening frame securely coupled to the motor stator and extending over the distributed coils of the motor so as to allow the sensor fastening frame to rotate about an axle of the motor rotor, without interference with the distributed coils; and fastening the sensor to the sensor fastening frame proximate to one end of the axle of the motor rotor, thereby positioning the sensors to detect the magnetic field variations of the motor rotor.

For the aforementioned sensor fastening method, the shape of the sensor fastening frame conforms to the shape of the periphery of the motor stator of the distributed-wound brushless DC motor, thereby allowing the sensor fastening frame to be in alignment with the motor stator after being coupled to the motor stator.

The present invention allows installation of Hall sensors on a traditional distributed-coil brushless AC motor stator, which is readily available on the market. Hence, the brushless DC motor is then allowed to use such a low price component to lower manufacturing costs, thus giving manufacturers the incentive to manufacture such a brushless DC motor to make the technology ubiquitous in the future.

DETAILED DESCRIPTION OF PREFERRED EMBODIMENTS

The following illustrative embodiments are provided to illustrate the disclosure of the present invention; these and other advantages and effects can be readily understood by those in the art after reading the disclosure of this specification.

Figure 1:
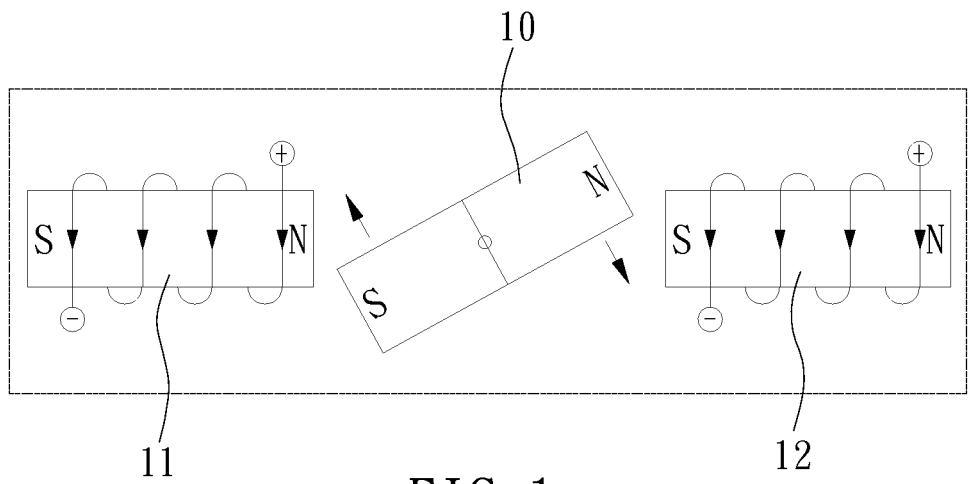
FIG. 1 illustrates the electromechanical principle and design of a brushless DC motor operation.
Figure 2:
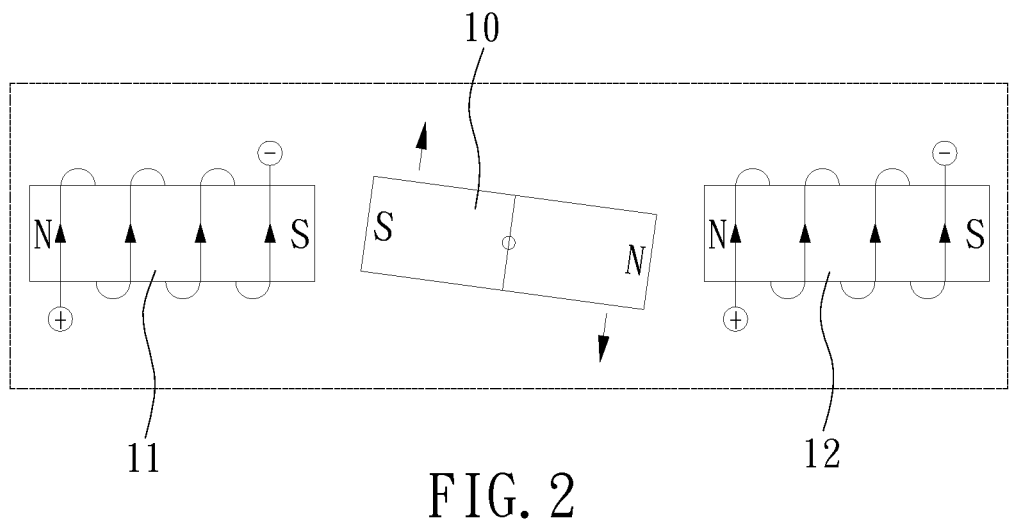
FIG. 2 is another diagram illustrating the electromechanical principle and design of a brushless DC motor operation.
Figure 3:
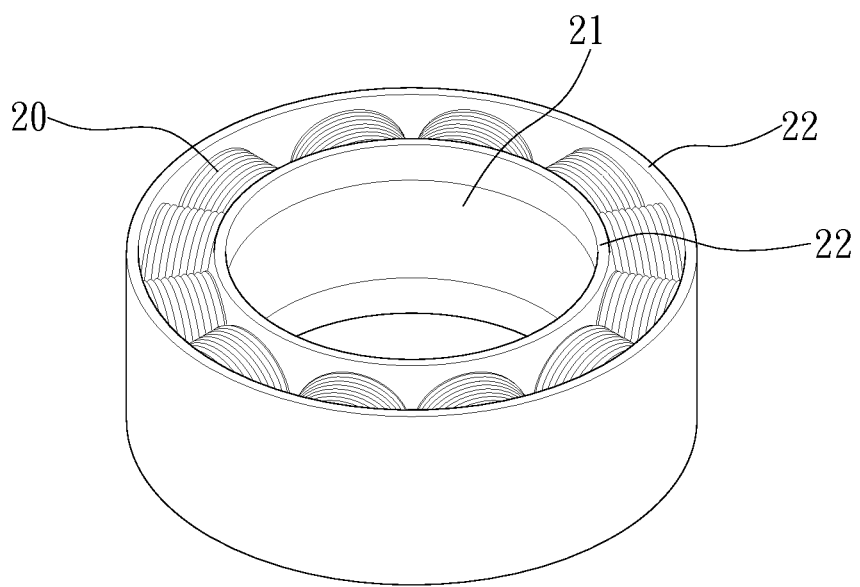
FIG. 3 is a diagram showing the structure of a stator of a conventional brushless DC motor having concentrated coils.
Figure 4:
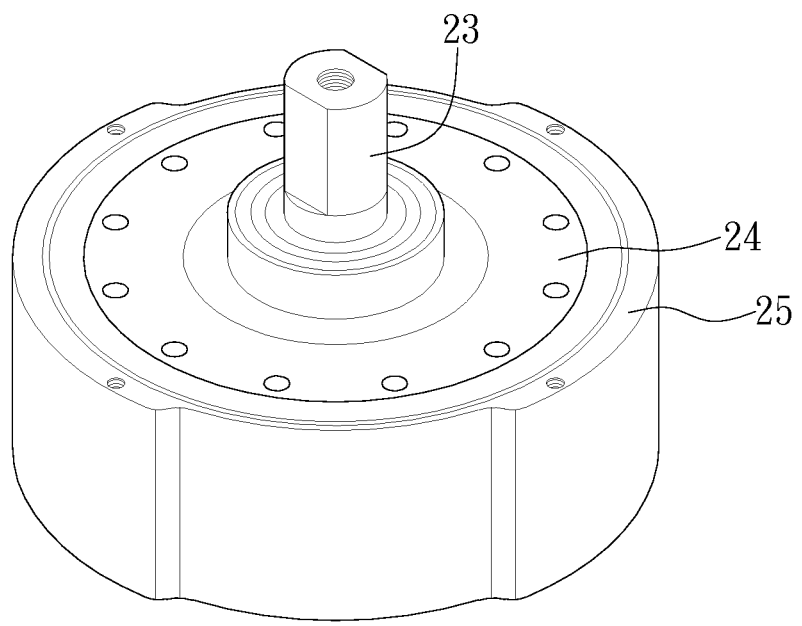
FIG. 4 is a diagram showing the structure of a stator of a conventional brushless DC motor having concentrated coils with a Hall sensor PCB installed.
Figure 5:
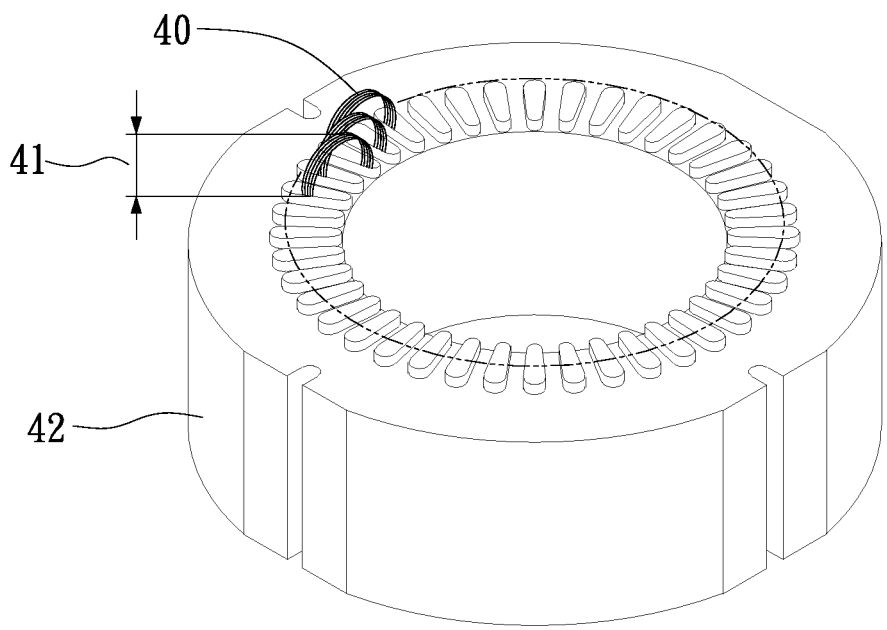
FIG. 5 is a diagram showing a conventional distributed-coil brushless AC motor stator.
Figure 6:
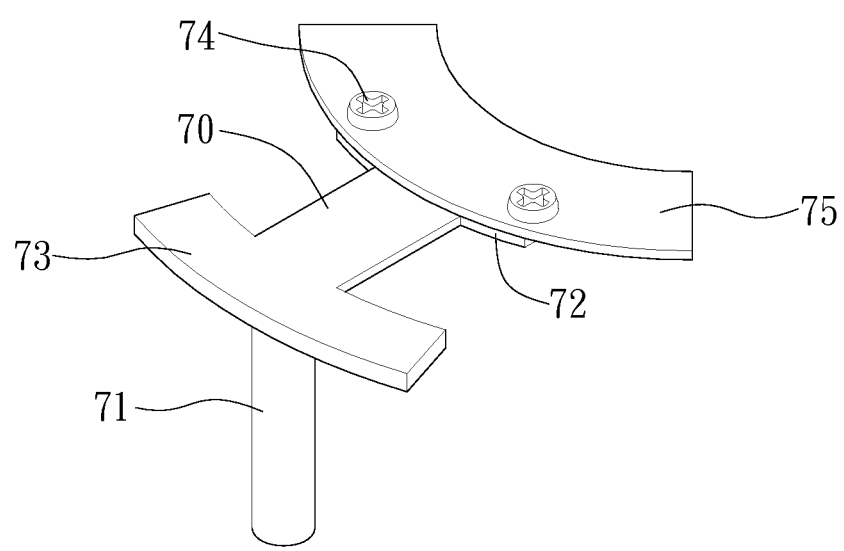
FIG. 6 is a diagram showing a sensor fastening frame according to a first embodiment of the present invention.
Figure 7:
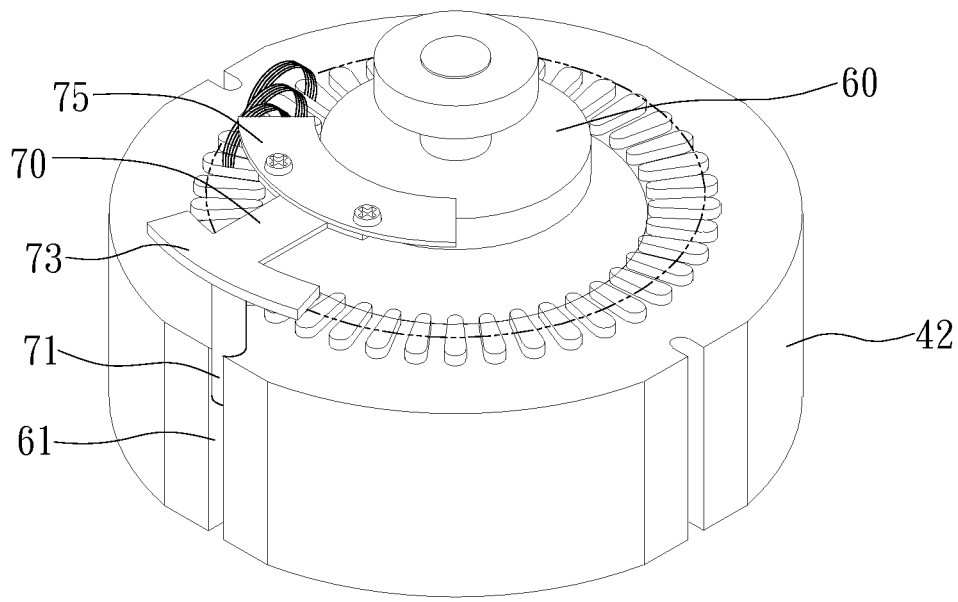
FIG. 7 is a diagram showing the sensor fastening frame installed on a distributed-wound brushless DC motor stator according to the first embodiment of the present invention.

FIGS. 6 and 7 are drawings in accordance with a first embodiment of the present invention. As shown in FIG. 6, the present embodiment provides a sensor fastening frame including a frame body 70, a second coupling portion 71 installed on the frame body 70, and a fastening part 72 attached onto the frame body 70 and attached onto a different plane than that of the second coupling portion 71. The three parts form an assembly by welding, for example.

In the present embodiment, the second coupling portion 71 is perpendicular to the frame body 70, and a side of the frame body 70 is proximate to the second coupling portion 71 so as for the frame body 70 to form an arc-shaped structure 73. The arc-shaped structure 73 has a curvature and a center-of-curvature the same as that of the periphery of the motor stator (as shown in FIG. 7). The fastening part 72 is installed with a Hall sensor PCB 75 (only the PCB is illustrated, not the hall sensors) via a fastening screw 74. The Hall sensor PCB 75 forms an arc shape in the present embodiment. The Hall sensor PCB 75 is just located at and covers the region in which the magnetism of the rotor is active. The sensor fastening frame can be made of non-magnetic material so as to prevent the Hall sensor PCB 75 from interference. Examples of such a material are aluminum, copper, zinc, tantalum, and stainless steel or plastic. The sensors of the Hall sensor PCB 75 detect magnetic field variations.

FIG. 7 is a diagram illustrating installation of the sensor fastening frame on a motor stator of a distributed-wound brushless DC motor in accordance with a first embodiment of the present invention. A motor stator 42 of the distributed-wound brushless DC motor adopts the structure of a distributed-coil stator of a conventional AC motor. A BLDC motor rotor 60 is at the axle. For the convenience of description, the motor casing is not shown.

In the present embodiment, the second coupling portion 71 of the sensor fastening frame is fastened in position to a first coupling portion 61 of the motor stator 42. The first coupling portion 61 is a structural feature that a conventional AC motor stator typically has in general. The fastening methods are either screw-tightening or gluing.

The height of the second coupling portion 71 is sufficient to allow the sensor fastening frame to cross over the windings of the motor stator 42, thereby positioning the Hall sensor PCB 75 on the magnetic structure of the motor rotor 60 via the frame body 70.

The arc-shaped structure 73 of the sensor fastening frame is in close proximity to the interior surface of the motor casing (not shown) and the Hall sensor PCB 75 is aligned with the axle of the motor rotor 60 automatically, complying with the orientation requirements of the Hall components. As Hall sensors and their orientation requirements are well known by persons skilled in the art, they are not described herein.

In other words, the sensor fastening method according to the present embodiment is used for attaching the sensor fastening frame by fastening in position the sensor fastening frame to a first coupling portion 61 of the motor stator 42 of a distributed-coil brushless DC motor for one or more sensors (such as those of a Hall sensor PCB 75) for detecting magnetic field variations of the motor rotor 60 of a distributed-wound brushless DC motor. An example of the first coupling portion 61 is a guiding slot. In this regard, the sensor fastening method comprises providing a fastening frame (e.g. the sensor fastening frame shown in FIG. 8) securely coupled to the motor stator 42 and extending over distributed coils of the motor so as to allow the fastening frame to rotate about the axle of the motor rotor 60, without interference with the distributed coils. In addition, the sensor circuit board is fastened to the sensor fastening frame proximate to one end of the axle of the motor rotor 60, thereby allowing one or more sensors of the sensor circuit board to detect magnetic field variations of the motor rotor 60. In particular, the shape of the sensor fastening frame conforms to the shape of the periphery of the motor stator 42 of the distributed-wound brushless DC motor, thereby allowing the sensor fastening frame to be in alignment with the motor stator 42 after being coupled to the motor stator 42.

Figure 8:
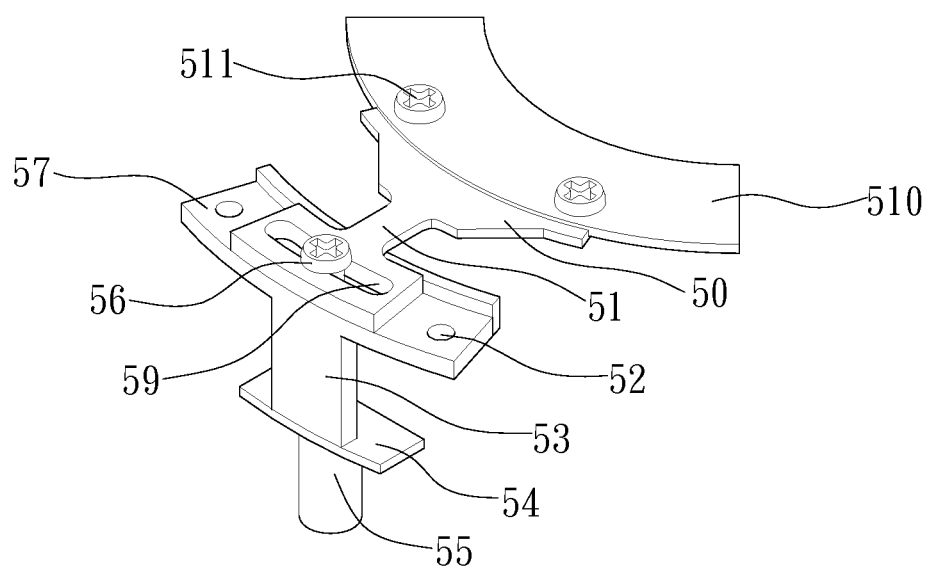
FIG. 8 is a diagram showing a sensor fastening frame according to a second embodiment of the present invention.
Figure 9:
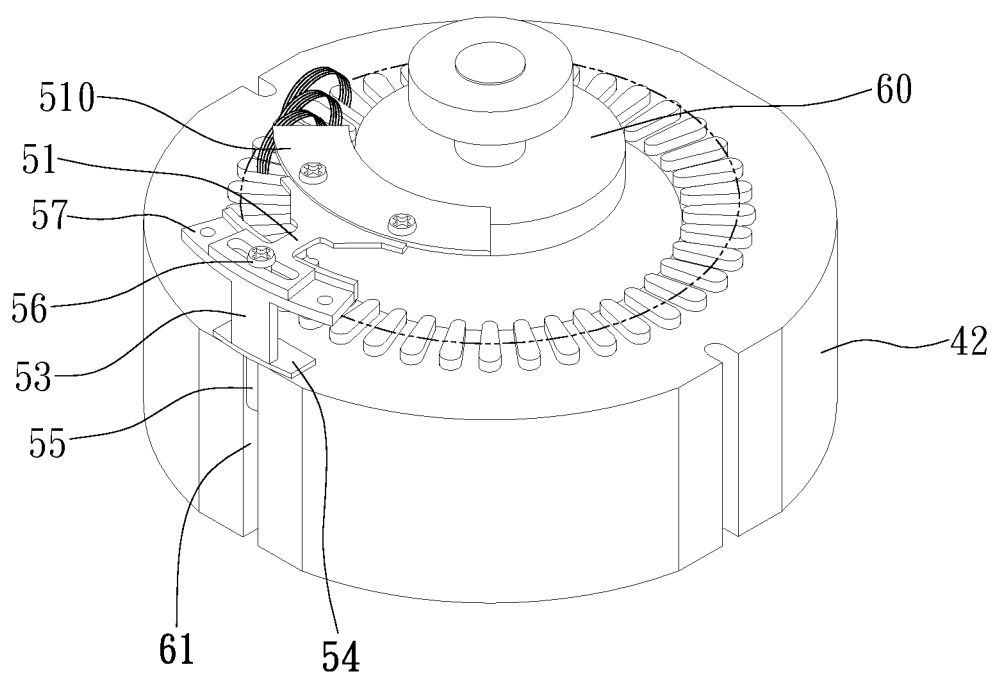
FIG. 9 is a diagram showing the sensor fastening frame installed on a distributed-coil brushless DC motor stator according to the first embodiment of the present invention.

FIGS. 8 and 9 are drawings in accordance with a second embodiment of the present invention, wherein detailed descriptions of same components in the preceding embodiment are omitted.

In the second embodiment, a sensor fastening frame has a fastening part (formed by a carrier board 54 and a fastening pin 55), a second coupling portion 53, and a frame body 51. The second coupling portion 53 is a rectangular structure with one end connected with the carrier board 54 and the other end connected with a sliding rail 57. The carrier board 54 and the sliding rail 57 together form a bar-like arc with a center-of-curvature conforming to the curvature of the periphery of the motor stator 42 paired with the arc. The sliding rail 57 has a plurality of screw holes 52 for receiving and engaging a plurality of adjustment screws 56. The fastening pin 55 is a circular pin protruding from the surface of the carrier board 54 and orthogonal to the carrier board 54.

The frame body 51 is a planar, bar-like body. Two opposite ends of the frame body 51 form an adjustment slot 59 and a fastening part 50, respectively. The adjustment slot 59 is a bar-like and arc-shaped opening with its center-of-curvature being the same as the sliding rail 57 paired with the open slot 59. The fastening part 50 can be a fastening board having an arc-shaped carrier end. The carrier end carries a Hall sensor PCB 510. The fastening part 50 has a plurality of holes for accepting screws 511. The Hall sensor PCB 510 of the present embodiment also forms an arc. The area and location of the arc just cover the region in which the magnetism of the rotor is active.

The assembly method of the sensor fastening frame according to the present embodiment is to fasten the Hall sensor PCB 510 to the arc-shaped carrier end of the fastening part 50 via the fastening screws 511. After assembly, the frame body 51 is securely coupled to the top of the sliding rail 57 by penetrating the adjustment slot 59 via one or more screws 56. Upon completion, the sensor fastening frame appears to be an inverted L-shape. The frame body 51 then moves on the sliding rail 57 along the pre-configured curvature of the open slot 59. The sensor fastening frame can be made up of non-magnetic material to prevent interference of the Hall sensor PCB 510. Examples of such non-magnetic material are aluminum, copper, zinc, tantalum and stainless steel or plastic.

As shown in FIG. 9, in this second embodiment, the motor stator 42 of the distributed-wound brushless DC motor is the same as the one shown in the first embodiment, indicating that it is formed by using the distributed-wound stator of a conventional AC motor. The motor rotor 60 is located at the axle. For convenience of description, a motor casing is not illustrated.

The sensor fastening frame of the present embodiment uses the fastening pin 55 and the first coupling portion 61 (such as a guiding slot) of the motor stator 42 to fasten in position the sensor fastening frame. The first coupling portion 61 is generally a necessary structure of a distributed-wound stator of a conventional AC motor. The fastening methods are tightening with screws or gluing.

The height of the second coupling portion 53 is sufficient to allow the sensor fastening frame to cross over the windings of the motor stator 42, thereby positioning the Hall sensor PCB 510 over the magnetically active structure of the motor rotor 60 via the frame body 51. The carrier board 54 forms a right angle with the fastening pin 55, thereby increasing the stability of the frame structure and providing stability of the relative positions between the second coupling portion 53 and the distributed-wound stator 42.

The arc shape of the carrier board 54 and the sliding rail 57 are in close proximity to the interior of motor casing, allowing the position of the center-of-curvature of the relevant moving parts to be the same as that of the motor stator 42 paired with the sliding rail 57 that is located near the axle of the motor rotor 60. Hence, as the Hall sensor PCB 510 moves along the sliding rail 57, the angle is varied with reference to the center, which is the axle of the motor rotor 60, thereby complying with the requirements of Hall component adjustment.

In the second embodiment, the frame body 51 is in close proximity to the arc-shaped structure 73 of the first embodiment, where the adjustment slot 59 is installed. In addition, the second coupling portion 53 is proximate to a side of the frame body 51, forming the bar-like and arc-shaped sliding rail 57. This design is effective as long as the bar-like and arc-shaped sliding rail 57 has a periphery that has the same curvature as the center-of-curvature as the periphery of the motor stator 42, and the frame body 51 can be fastened to the bar-like and arc-shaped sliding rail 57 by combining the adjustment slot 59 with the adjustment screws 56. Also, this design is effective as long as the bar-like and arc-shaped carrier board 54 has a periphery that has the same curvature and the center-of-curvature as the periphery of the motor stator 42, even though the second coupling portion 53 is formed with the bar-like arc-shaped carrier board 54, and the frame body 51 located between the bar-like and arc-shaped sliding rail 57 and the bar-like and arc-shaped carrier board 54 is a square. In addition, the sensor having a Hall sensor PCB 510 can be fastened to the fastening part 50 (shown in FIG. 8) using methods such as screw tightening, gluing, riveting, welding, hook-fastening, and other fastening techniques or structures.

In the second embodiment, the second coupling portion 53 is in the form of a protruding pin capable of being inserted into the first coupling portion 61 functioning as the guiding slot. The first coupling portion 61 functioning as the guiding slot and the second coupling portion 53 are of a cross section, such as circle, triangle, square, oval or any other shape that allows the second coupling portion 53 to be coupled to the first coupling portion 61 of the motor stator 42, thereby fastening in position the sensor fastening frame.

While the invention has been shown and described with reference to preferred embodiments for purposes of illustration, it will be understood that variations and modifications can be effected thereto by those skilled in the art without departing from the spirit and scope of the invention as defined by the appended claims. For example, the fastening pin 55 can be square-shaped or triangular, the Hall sensor PCB 510 can be in the shape of either a circle or a square, and the second coupling portion 53 may be a cylinder.

According to the above descriptions, it can be understood that the present invention, which does not change the structure of the distributed-wound stator of a conventional AC motor, can apply the mature and low-cost distributed-wound stator of a conventional AC motor to a brushless DC motor. Manufacturers adopting the invention are then able to continue to use established production equipment and test equipment to lower the production failure rate, greatly expanding the feasibility of employing brushless DC motors.

In summary, the foregoing embodiments and advantages are merely exemplary and are not to be construed as limiting the present invention. The present disclosure can be readily applied to other types of apparatus. The description of the present invention is intended to be illustrative, not to limit the scope of the claims. Many alternatives, modifications, and variations will be apparent to those skilled in the art. In the claims, means-plus-function clauses are intended to cover the structures described herein as performing the recited function, including structural equivalents and equivalent structures.

What is claimed is:

1. A sensor fastening frame for fastening in position a sensor to an axial side surface of a motor stator of a distributed-wound brushless DC motor, wherein the motor stator has a first coupling portion, the sensor fastening frame comprising:
    a wall-less flat plate extending toward a second direction;
    a second coupling portion directly provided to the plate and extending toward a first direction perpendicular to the second direction, further comprising a carrier board that is integral with a fastening pin; and
    a planar flat fastening part directly attached onto the plate and parallel to the plate, and disposed at a same level as the plate for directly securely fastening the sensor and extending toward the second direction,
    wherein the fastening pin of the second coupling portion is installed to said motor stator at a fixed angular location with the carrier board resting upon the axial side surface of the motor stator; and
    wherein the plate is formed with an adjustment slot, and the second coupling portion is formed with a sliding rail for being engaged with the adjustment slot via at least an adjustment screw, so as to secure the second coupling portion to the plate such that the relative angular location of the plate is adjustable with respect to the fixed angular location of the second coupling portion, and
    wherein the sliding rail is spaced apart from the carrier board a height sufficient to allow the planar flat fastening part to cross over windings of the motor stator.

2. The sensor fastening frame of claim 1, wherein a side of the plate proximate to the second coupling portion forms an arc having a curvature and a center-of-curvature the same as that of a periphery of the motor stator.

3. The sensor fastening frame of claim 1, wherein a curvature of a periphery as well as a center-of-curvature of the carrier board are the same as those of the motor stator.

4. The sensor fastening frame of claim 1, wherein the first coupling portion is a guiding slot, and the fastening pin of the second coupling portion is in a form of protruding pin capable of being inserted into the guiding slot.

5. The sensor fastening frame of claim 4, wherein the first coupling portion and the second coupling portion are of a cross section selected from the group consisting of circle, triangle, square, and oval.

6. The sensor fastening frame of claim 1, wherein the sensor is fastened to the fastening part via one of the fastening methods consisting of screwing, gluing, riveting, welding and hooking.

7. The sensor fastening frame of claim 1, wherein the plate, the second coupling portion, and the fastening part are made of plastic or non-magnetic metal.

8. The sensor fastening frame of claim 7, wherein the non-magnetic metal is a material selected from the group consisting of aluminum, copper, zinc, tantalum and stainless steel.

9. The sensor fastening frame of claim 1, wherein the sensor serves to detect magnetic field variations of the motor.

10. The sensor fastening frame of claim 9, wherein the sensor is a Hall-effect sensor.

* * * * *